3 Sheets--Sheet 1.

JOHN B. SHAFER.

Improvement in Railway Cattle-Cars.

No. 4,368. Reissued May 2, 1871.

*Witnesses:-*
Wm. H. Rowe
Jas. S. Peyton

The National Cattle Car Co.
Assignee of John B. Shafer
by its Attorney
Wm. D. Baldwin

AM. PHOTO LITHOGRAPHIC CO. N.Y. (OSBORNE'S PROCESS.)

JOHN B. SHAFER.

3 Sheets--Sheet 2.

Improvement in Railway Cattle-Cars.

No. 4,368.

Reissued May 2, 1871.

*Witnesses:-*
Wm. H. Rowe
Joel Peyton.

The National Cattle Car Co.
Assignee of John B. Shafer
by its Attorney
Wm. D. Baldwin

AM. PHOTO-LITHOGRAPHIC CO. N.Y. (OSBORNE'S PROCESS.)

3 Sheets--Sheet 3.

JOHN B. SHAFER.

Improvement in Railway Cattle-Cars.

No. 4,368. Reissued May 2, 1871.

*Witnesses:-*
Wm. H. Rowe,
Joel Pytn.

The national battle car co.
Assignee of John B. Shafer
by Wm. D. Baldwin
Attorney

AM. PHOTO-LITHOGRAPHIC CO. N.Y. (OSBORNE'S PROCESS.)

United States Patent Office.

THE NATIONAL CATTLE-CAR COMPANY, OF SALEM, OHIO, ASSIGNEE OF JOHN B. SHAFER, DECEASED.

Letters Patent No. 29,409, dated July 31, 1860; reissue No. 4,368, dated May 2, 1871.

IMPROVEMENT IN RAILWAY CATTLE-CARS.

The Schedule referred to in these Letters Patent and making part of the same.

*To all whom it may concern:*

Be it known that JOHN B. SHAFER, now deceased, formerly of Grafton, in the county of Taylor and State of Virginia, did, in his lifetime, invent certain new and useful Improvements in Cars for the Transportation of Cattle or other Live-Stock upon Railroads, which cars were also suitable for the carriage of other freight, of which improvements the following is a specification.

The object of the invention is to diminish the number of cars required to meet the wants of railroads by adapting cars to be used either as freight or stock-cars; to which end, The improvements consist—

First, in providing a car with a floor capable of being used as a deck to divide the car into two stories, or of being raised or lowered out of the way to leave the car entirely clear for freight.

Second, in providing a car with hinged or folding partitions capable of being swung close up to the side of the car to leave its body unobstructed, or of being swung out to form stalls for stock.

The accompanying drawing shows so much only of a car-body as is necessary to illustrate the invention herein claimed.

A car-body, A, of ordinary open-work construction, is to be mounted upon suitable trucks in the usual way, and provided with central openings in each side for the passage of stock or freight.

Figure 5:
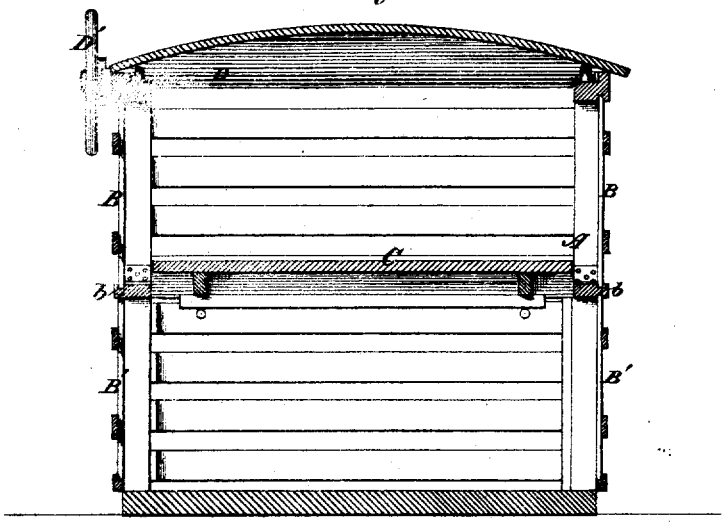
Figure 5 represents a vertical transverse section through the car, with the middle deck in the position shown in figs. 1 and 2.

These openings are closed, when desired, by sliding gates B B′, fig. 5, arranged one above the other, serving as independent doors, the one to the lower story and the other to the upper one; or as one door when the car is used as a "single-decker."

Figure 3:
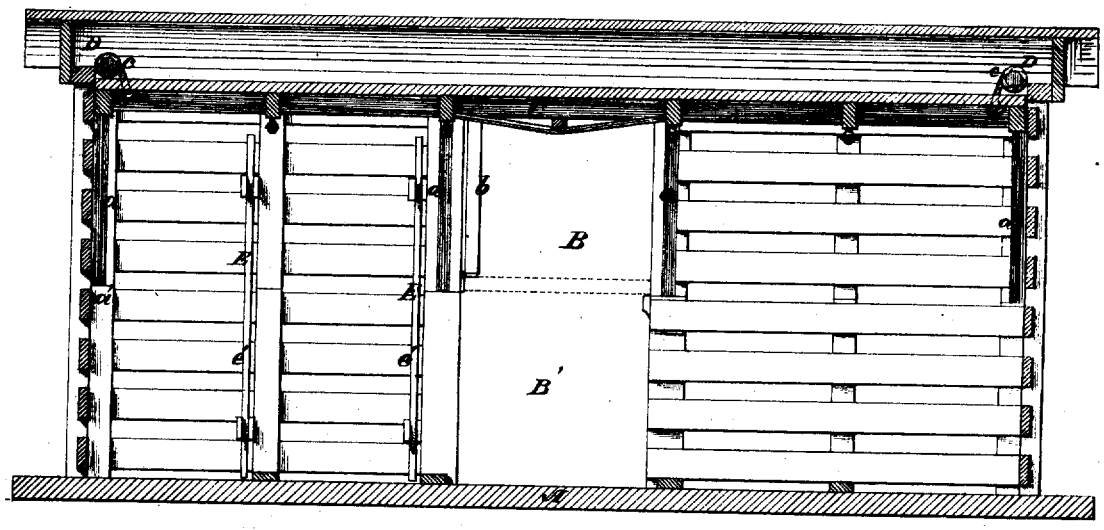
Figure 3 represents a vertical longitudinal section through the line *x x* of fig. 4.

These gates are separated by a bar, *b*, figs. 3 and 5, extending across the doorway, but hinged at one end so that it may be turned up from the position shown in dotted lines in fig. 3 to the position shown by the full lines in the same figure. When lowered, as in fig. 5, this bar forms the division between the two gates; when raised, it leaves the doorway unobstructed for the entrance of large stock.

A middle floor or deck, C, is shown as arranged either to slide up to the top of the car or be lowered to the floor thereof by means of ropes or chains *c*, attached to the four corners of the deck and wound around cross-shafts D, operated by hand-wheels D′ outside the car. The floor is held in any desired position by suitable pawls and ratchets on the cross-shafts.

The invention, however, is not confined to any particular mechanism for raising or lowering the deck. The sleepers, sills, and other parts of the middle deck all move with it; consequently, when this deck is removed the entire car is clear of obstruction. This middle deck need be no heavier than the stationary ones in use before this invention, and should be so braced as to be capable of resisting all the strains to which it may be subjected.

The car-frame is made with double posts *a* at each end and on each side of the doors, between which posts the sleepers of the middle deck are made to slide, thus guiding the latter in its vertical movement. Fastenings may be used to prevent the car from spreading. When raised the middle deck may be locked by bolts or other fastenings, and when lowered for use it rests on shoulders *a′* of the post or framework, which gives it a solid bearing and firm support.

Stall-partitions, E, are preferably so constructed as to fit nicely into the sides of the car between the frame-posts, and are so hinged or otherwise equivalently connected to the sides of the car as to swing or open and close horizontally.

Each partition is likewise made in sections *e e′*, so hinged together as to fold one upon the other to facilitate the shutting of the partitions close up to the side of the car. When either extended or closed, the partitions may be secured in position by bolts or other similar fastenings.

Figure 1:
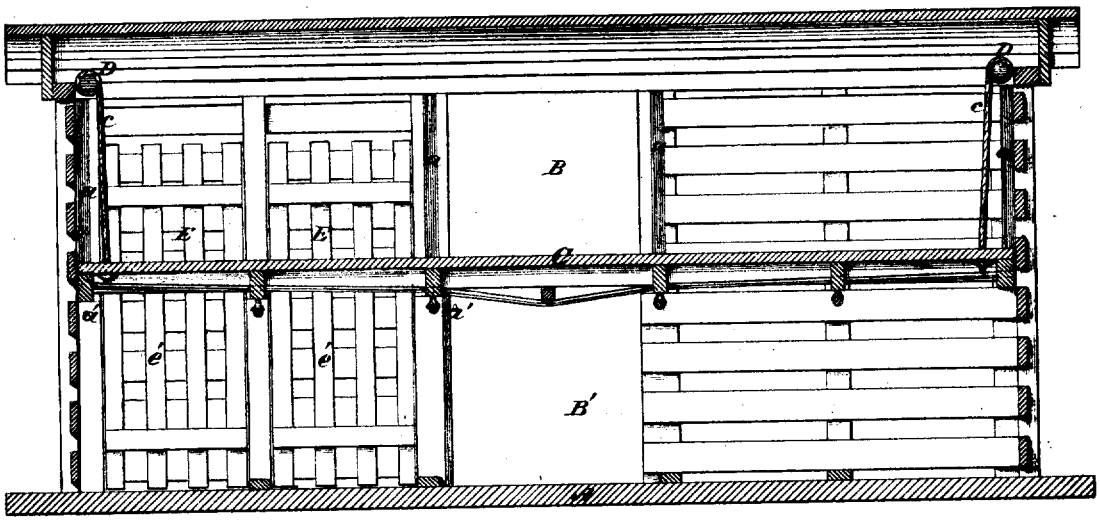
Figure 1 represents a longitudinal central vertical section through the car, with the stall-partitions folded against the side of the car and the movable deck lowered to convert the car into a "double-decker."
Figure 2:
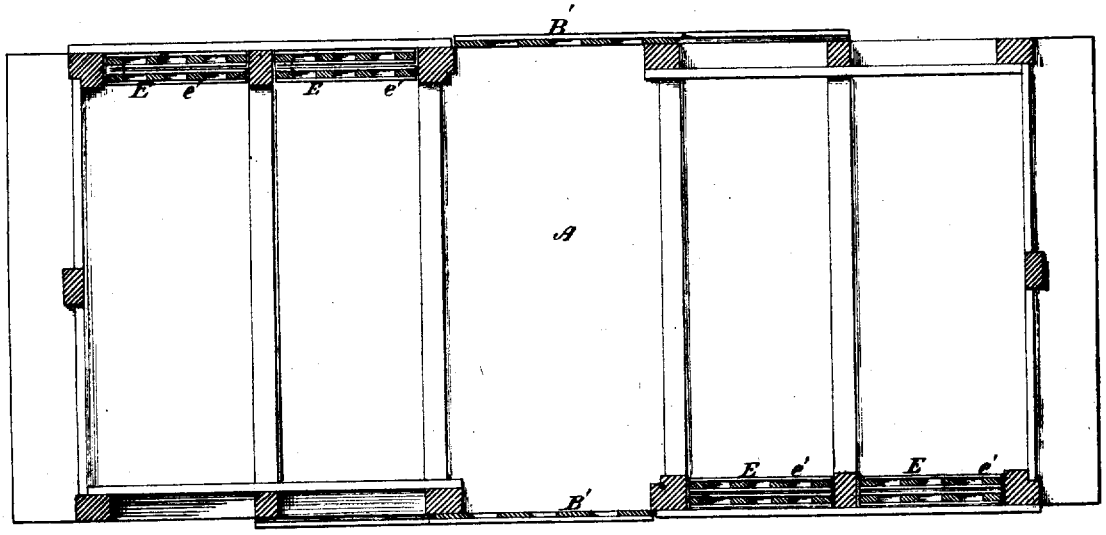
Figure 2 represents a horizontal section of the same below the movable deck.
Figure 4:
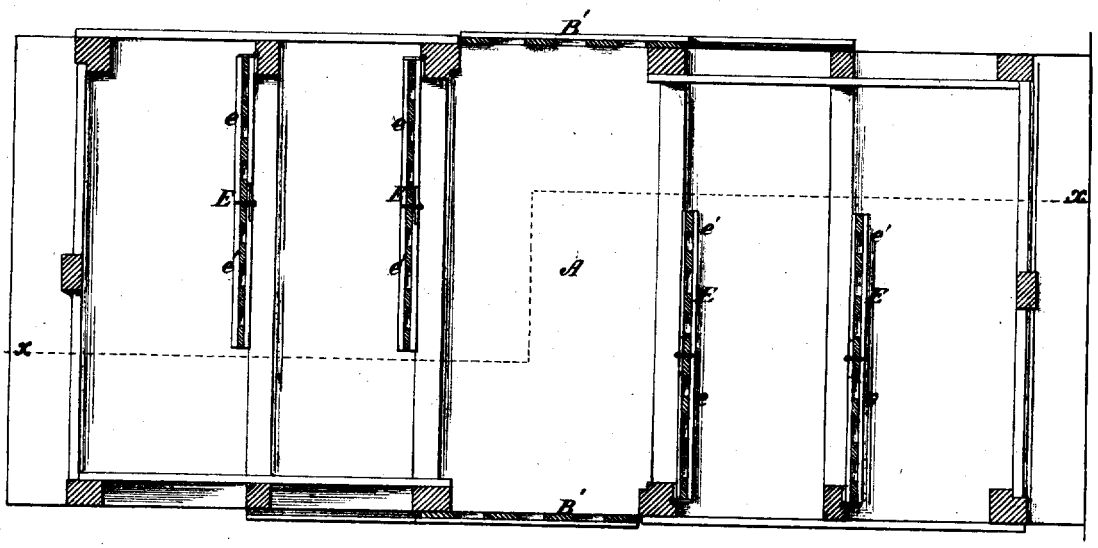
Figure 4 represents a horizontal section through the car, with the movable deck removed and the stall-partitions extended.
Figure 6:
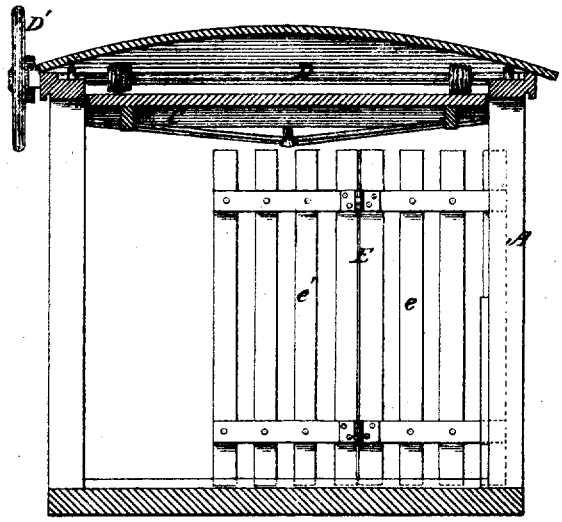
Figure 6 represents a vertical transverse section, with the middle deck and stall-partitions arranged as in figs. 3 and 4.

In figs. 1 and 2 the partitions are shown as folded, and in figs. 3, 4, and 6 as extended. These partitions are likewise shown as arranged on opposite sides of the car at opposite ends. In the drawing two stalls only are shown on each side, but the number may, of course, be varied. The object of the arrangement of the stalls on opposite sides of the car is to equalize the weight on either side of the car and yet to leave room for access to the stalls. It will be noticed that the partitions nearest the doorways are hinged to opposite sides thereof, and swing away from the doors when folded. This arrangement gives more room for the cattle to enter the end stalls, and when these are full the partitions can be extended to form other stalls next the doors. In the transportation of horses a transverse position of the stalls is preferable.

When the car is used as a double-decker the partitions are not liable to be fouled by the stock, and, being thoroughly ventilated, are, in a measure, kept clean and inodorous, and when the deck is removed the partitions may easily be extended. One portion of the car may be divided into two stalls while the other portion is left unobstructed. The construction of the partitions in sections enables them to be folded into a smaller space than they would occupy if not so constructed.

The facility with which these improvements may be adapted to ordinary stock-cars and the capacity thus given to them of being used either as single-deckers for freight or stock; as double-deckers for small stock; or as stall-cars for large stock, render them of great utility.

What is claimed as the invention of the said JOHN B. SHAFER, is—

1. The combination, with a stock-car, of swinging partitions constructed to fold against the sides of the car, substantially as hereinbefore set forth, so as to leave the car unobstructed.

2. The combination, with a stock-car, of two series of folding partitions hinged to opposite sides and at opposite ends of the car, substantially as set forth, to distribute evenly the weight on the trucks and to leave a passage-way through the car.

3. The sectional folding partitions, constructed substantially as and for the purpose described.

4. Hinging the swinging partitions on opposite sides of the opposite door-ways, as described, so that when folded they shall swing away from the doors to give a wider entrance.

5. The combination, with a stock-car, of a movable middle deck, to convert the car from a "double-decker" into an unobstructed "single-decker," or *vice versa*, substantially as set forth.

6. The combination, in a stock-car, of a vertically movable middle deck with folding partitions, to convert the car from a double-decker into a single-decker with stalls, or *vice versa*, substantially as set forth.

7. The combination, in a stock-car, of a movable deck, with guides to control its movement, substantially as set forth.

8. The combination, in a stock-car, of a movable deck, with guides to control its movement and fixed supports to give it a firm bearing when in position to receive its load, substantially as set forth.

9. The combination, in a stock-car, of a movable deck, with cords and a windlass or their equivalents for raising and lowering the deck, substantially as set forth.

10. The combination, in a stock-car, of sliding double doors, with a hinged intermediate bar swinging across the doorway, as set forth.

NATIONAL CATTLE-CAR CO.,
*By* AMOS RANK, *Prest.*

Witnesses:
R. V. HAMPSON,
ISAAC H. SEVING.